United States Patent
Bakshi et al.

(10) Patent No.: US 11,343,254 B2
(45) Date of Patent: *May 24, 2022

(54) REDUCING LATENCY

(71) Applicant: Google LLC, Mountain View, CA (US)

(72) Inventors: Nikhil Bakshi, Mountain View, CA (US); Oliver Michael King, Mountain View, CA (US); Dooyum Jeremiah Malu, Mountain View, CA (US); Tommaso Francesco Bersano Begey, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/053,409

(22) Filed: Aug. 2, 2018

(65) Prior Publication Data

US 2018/0343264 A1 Nov. 29, 2018

Related U.S. Application Data

(63) Continuation of application No. 15/378,583, filed on Dec. 14, 2016, now Pat. No. 10,075,449, which is a
(Continued)

(51) Int. Cl.
  *H04L 29/06* (2006.01)
  *H04L 67/568* (2022.01)
  (Continued)

(52) U.S. Cl.
  CPC ............ *H04L 63/102* (2013.01); *H04L 63/08* (2013.01); *H04L 67/2842* (2013.01);
  (Continued)

(58) Field of Classification Search
  None
  See application file for complete search history.

(56) References Cited

U.S. PATENT DOCUMENTS 6,088,679 A   7/2000  Barkley
6,486,874 B1  11/2002 Muthuswamy et al.
(Continued)

FOREIGN PATENT DOCUMENTS

KR   10-2012-0016334   2/2012
WO   2014/194441      12/2014
(Continued)

OTHER PUBLICATIONS

AU Office Action Issued in Austrailian Application No. 2016389047, dated Apr. 2, 2019, 10 pages.
(Continued)

*Primary Examiner* — Benjamin E Lanier
(74) *Attorney, Agent, or Firm* — Fish & Richardson P.C.

(57) ABSTRACT

Methods, systems, and apparatus, including computer programs encoded on a computer storage medium, for reducing latency in network communications and data presentation. In one aspect, a user session is initiated in which data related to an account is presented to the user. A user group to which the given user has been assigned is identified. A first dataset related to the account is selected based on the user group. A second dataset related to the account is selected based on types of data previously requested by various other users in the user group. A user interface for the account is updated to present at least a portion of the first dataset. Latency in updating the user interface is reduced when presenting additional portions of the first dataset or the second dataset by providing, to the client device, the second dataset prior to receiving a request for the second dataset.

17 Claims, 7 Drawing Sheets

Related U.S. Application Data continuation of application No. 15/005,788, filed on Jan. 25, 2016, now abandoned.

(51) Int. Cl.

| | | |
|---|---|---|
| *H04L 67/5681* | (2022.01) | |
| *H04L 67/50* | (2022.01) | |
| *H04L 67/306* | (2022.01) | |
| *G06Q 50/00* | (2012.01) | |
| *H04L 67/289* | (2022.01) | |
| *H04L 67/142* | (2022.01) | |
| *G06F 3/0481* | (2022.01) | |
| *H04L 67/61* | (2022.01) | |

(52) U.S. Cl.
CPC ........ *H04L 67/2847* (2013.01); *G06F 3/0481* (2013.01); *G06Q 50/01* (2013.01); *H04L 67/142* (2013.01); *H04L 67/22* (2013.01); *H04L 67/289* (2013.01); *H04L 67/306* (2013.01); *H04L 67/322* (2013.01)

(56) References Cited

U.S. PATENT DOCUMENTS

| | | |
|---|---|---|
| 6,539,382 B1 | 3/2003 | Byrne et al. |
| 6,891,920 B1 | 5/2005 | Minyard |
| 7,698,230 B1 | 4/2010 | Brown |
| 7,752,203 B2 | 7/2010 | Chowdhury et al. |
| 8,352,382 B1 | 1/2013 | Katta |
| 8,832,184 B1 | 9/2014 | Britto et al. |
| 9,525,712 B1 | 12/2016 | Batra |
| 9,720,948 B2 | 8/2017 | Jain |
| 9,838,399 B2 | 12/2017 | Bakshi et al. |
| 2002/0193076 A1 | 12/2002 | Rogers |
| 2003/0135553 A1 | 7/2003 | Pendakur |
| 2003/0149526 A1 | 8/2003 | Zhou |
| 2006/0089932 A1 | 4/2006 | Buehler |
| 2006/0277271 A1 | 12/2006 | Morse et al. |
| 2008/0097792 A1 | 4/2008 | Marge |
| 2009/0276771 A1 | 11/2009 | Nickolov et al. |
| 2011/0208820 A1 | 8/2011 | Bittles |
| 2011/0276863 A1 | 11/2011 | Bhise |
| 2012/0173257 A1 | 7/2012 | Preiss |
| 2012/0221932 A1 | 8/2012 | Gleadall et al. |
| 2013/0042123 A1 | 2/2013 | Smith |
| 2013/0121597 A1 | 5/2013 | Hsu |
| 2014/0082558 A1 | 3/2014 | Lynch |
| 2014/0282915 A1 | 9/2014 | Tekwani |
| 2015/0186545 A1 | 7/2015 | Krutzler et al. |
| 2015/0278219 A1 | 10/2015 | Phipps |
| 2016/0142497 A1 | 5/2016 | Ullrich |
| 2017/0214674 A1 | 7/2017 | Bakshii et al. |
| 2017/0214676 A1 | 7/2017 | Bakshi et al. |

FOREIGN PATENT DOCUMENTS

| | | |
|---|---|---|
| WO | WO 2016061966 | 4/2016 |
| WO | WO 2014142209 | 2/2017 |

OTHER PUBLICATIONS

International Search Report and Written Opinion in International Application No. PCT/US2016/064369, dated Feb. 24, 2017, 16 pages.
EP Office Action in European Application No. 16816090, dated Mar. 26, 2020, 2 pages.
KR Office Action in Korean Application No. 10-2018-7024401, dated May 7, 2020, 4 pages (with English translation).
AU Office Action in Australian Application No. 2019203985, dated Jun. 5, 2020, 7 pages.
Korean Office Action in Korean Application No. 10-2018-7024401, dated Dec. 17, 2019, 20 pages (with English translation).
CN Office Action in Chinese Application No. 201680003902, dated Feb. 2, 2020, 27 pages (with English translation).
CN Office Action in Chinese Application No. 201680003902.8, dated Aug. 25, 2020, 13 pages (with English translation).
Extended European Search Report in European Application No. 20165179.1, dated Aug. 17, 2020, 10 pages.
JP Office Action in Japanese Application No. 2019-173284, dated Aug. 20, 2020, 6 pages (with English translation).
Peng et al, "Improving the Performance of Software System Based on Buffering Components of GUI in Client" Computer Engineering and Application, 2001.

REDUCING LATENCY

CROSS-REFERENCE TO RELATED APPLICATIONS

This application is a continuation application of, and claims priority to, U.S. patent application Ser. No. 15/378,583, titled "REDUCING LATENCY," filed on Dec. 14, 2016, which is a continuation of U.S. patent application Ser. No. 15/005,788, titled "REDUCING LATENCY," filed on Jan. 25, 2016. The disclosure of the foregoing application is incorporated herein by reference in its entirety for all purposes.

BACKGROUND

The Internet facilitates the exchange of information and transactions between users across the globe. This exchange of information enables data providers to provide data to a variety of users. Data may be provided in response to multiple requests received from a client device. However, each request requires the use of computing resources (e.g., servers and memory storage devices) and network resources (e.g., routers, switches, and network bandwidth) to respond with the requested data. In addition, each request takes some time for a data provider to identify the appropriate data and send the data over the network to the client device.

SUMMARY

This specification describes technologies relating to reducing latency in network communications and in data presentation.

In general, one innovative aspect of the subject matter described in this specification can be embodied in methods that include the actions of authenticating a given user as an authorized user of a given online account based on data submitted through a client device of the given user; initiating, for the given user and in response to the authenticating, a user session in which data related to an account is presented to the user, the account being accessible by multiple users having credentials to access the account; identifying a user group to which the given user has been assigned based on (i) similarities between the given user's interactions with user interface elements presented in the user interface of the account during previous user sessions and other interactions of other users with the user interface elements or (ii) similarities between at least one type of data requested by the given user during the previous user sessions and at least one type of data requested by other users; selecting, based on the user group to which the given user has been assigned, a first dataset related to the account, the first dataset being selected based at least on (i) the types of data requested by the given user during the previous user sessions and (ii) user interface elements with which the given user has interacted during previous user sessions; selecting, based on types of data previously requested by various other users in the user group, a second dataset related to the account; updating a user interface for the account to present at least a portion of the first dataset in an initial account view for the account, the initial account view presenting multiple different types of data combined into a single presentation and that provides an overview of the account; and reducing latency in updating the user interface for the account when presenting additional portions of the first dataset or the second dataset at the client device by providing, to the client device, the second dataset prior to receiving a request for the second dataset from the client device, where the second dataset is cached at the client device and is not presented in the initial account view. Other embodiments of this aspect include corresponding systems, apparatus, and computer programs, configured to perform the actions of the methods, encoded on computer storage devices.

These and other embodiments can each optionally include one or more of the following features. In some aspects, the given user and the other users can be assigned to the user group using a machine learning process that creates multiple user groups and assigns users to the multiple user groups. In some aspects, the given user can be assigned to the user group based additionally on at least one of (i) a time range of data requested by the given user in a previous user session, (ii) data modified by the user, or (iii) a frequency with which the given user accesses data related to the account.

In some aspects, at least a portion of the second dataset can be selected based on at least one of (i) types of data requested by the given user in the previous user sessions, (ii) a time range of data requested by the given user in a previous user session, or (iii) a geographic region from which the given user has requested data in the previous user sessions. In some aspects, each of the multiple users is provided a different initial account view based on types of data requested by each of the multiple different users.

Some aspects can include updating, for each given user session initiated for the given user, a user profile for the given user with data that specifies user interface elements with which the given user interacted during the given user session and types of data that the given users requested during the user session and modifying the initial account view for the given user based on the updating.

Some aspects can include determining to update the cache of second data at the user device based on a data cost for updating the cache being less than a threshold cost and providing, to the user device, an updated dataset in response to determining to update the cache. Some aspects can include identifying two or more campaigns of the account that have at least one same characteristic and at least one characteristic that differs for each of the two or more campaigns and providing data that presents data of each of the two or more campaigns and in a manner that highlights the at least one characteristic of each of the two or more campaigns.

Particular embodiments of the subject matter described in this specification can be implemented so as to realize one or more of the following advantages. The latency in presenting data to a user can be reduced by pre-caching, at the user's device, data that the user is likely to request but has not yet requested. By pre-caching the data, the number of requests submitted over a network, and thus the amount of demand placed upon network and computing resources used to respond to the requests, can be reduced. This reduction in demand placed upon the network and computing resources can improve the performance of the network and computing resources by increasing the speed at which the resources respond to the requests and minimizing errors and performance degradation caused by overloading the resources. The demand placed upon computing resources is also reduced by retrieving requested data and additional data for pre-caching at the same time rather than querying a data source multiple times.

Pre-caching data that a user is likely to request also allows the client device to present the requested data quicker as the client device does not have to wait for a request to traverse the network, the server to identify the requested data, and the requested data to make its way to the client device. In addition, user frustration is reduced by presenting data without network in response to requests submitted by the user. The demand placed upon the network and computing resources can be also be reduced by selectively determining when to update the data stored in the cache.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
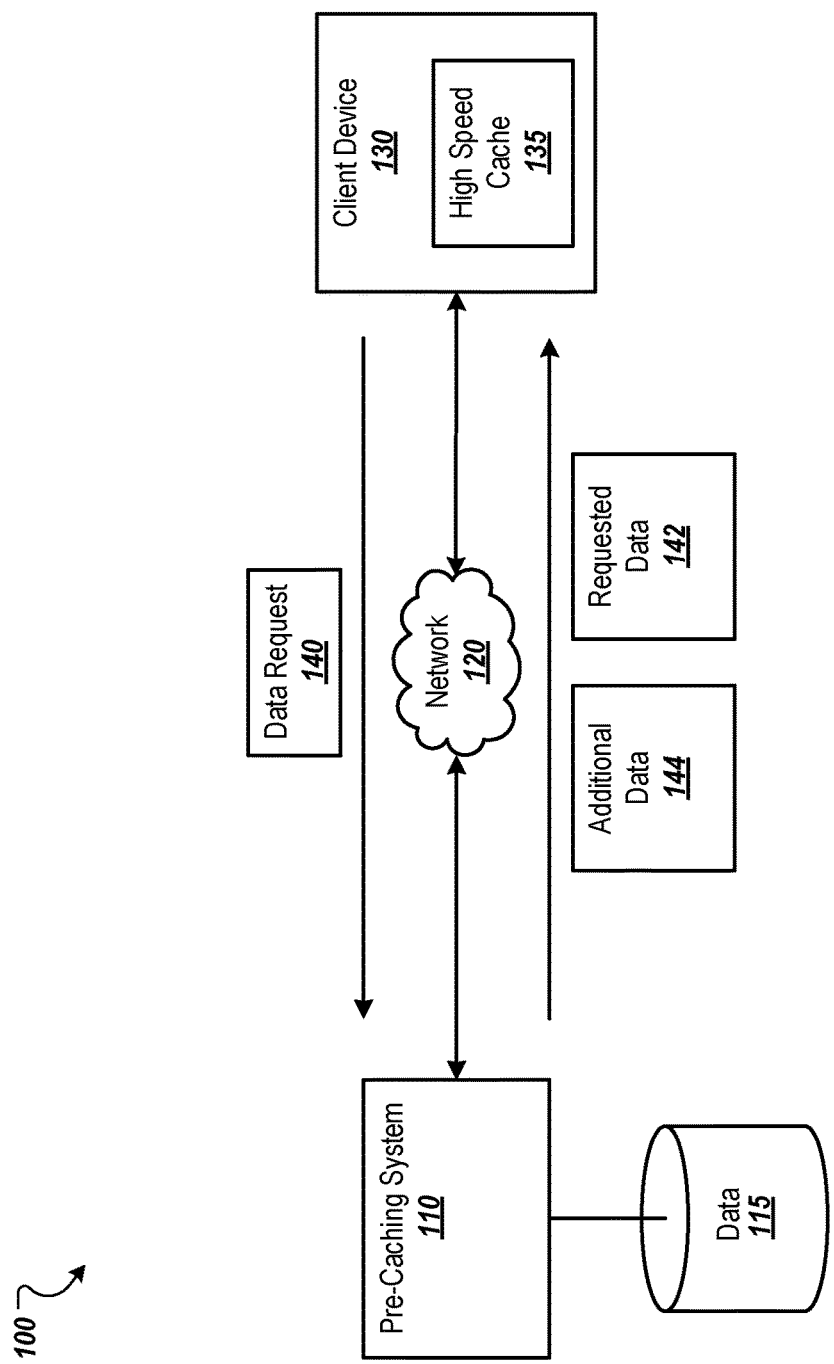
FIG. 1 is an example environment in which a pre-caching system provides data for caching at a client device.

A system can reduce latency in presenting data by sending data to a client device and caching the data at the client device prior to the client device submitting a request for the data. However, the amount of data that can be cached is generally smaller than the amount of available data. As such, the system must determine which data to cache for different users so that the benefits provided by caching data (e.g., faster user interface updates and/or real time interactions with the user interface) can be realized. The system can select data to provide to a client device based on a user's previous interactions with a user interface that presents the data. For example, if a user has requested particular data for a particular time period multiple times (e.g., data for the previous week), the system may provide the particular data for that time period prior to the user actually submitting a request for the data. If the user later submits a request for the data, the data is cached at the user device and can be obtained and presented more quickly than if the client device had to request the data from a remote system, e.g., over a network. Additional data can also be cached by the remote system for faster delivery to the client device.

The system can send data for presentation to a user and data for caching at the user's device when the user accesses an account managed by the system. For example, when a user logs into their account, the system can provide a user interface that includes an initial account view within a dashboard and additional data for caching at the user's device. The dashboard can include an overview of the account that includes a summary of data selected for the user based on the user's previous interactions with user interfaces provided by the system. The manner in which the data is presented can also be selected based on the user's previous interactions with user interfaces provided by the system. These user interactions can include, for example, particular user interface elements (e.g., controls, display cards, etc.) that the user has viewed, selected, or with which the user has interacted, types of data requested by or modified by the user, and/or dimensions of data (e.g., data within a particular time period or related to a particular geographic location). The user can then interact with user interface elements of the dashboard to view different data or view different types of presentations of the data. In response, the appropriate data can be obtained from the cached data or requested from the system that maintains the data.

The data presented in the initial account view and/or the data provided for caching at the client device can be selected based on a user group to which the user is assigned. For example, certain groups of users may request similar types of data and/or interact with similar types of user interface elements. In a particular example, users that have similar roles but in different organizations (e.g., brand managers) may request and view similar types of data and data within similar dimensions. In some implementations, the data that is cached for a given user can be selected based on actions performed by other users in the group even when the given user has not performed those actions.

FIG. 1 is an example environment 100 in which a pre-caching system 110 provides data for caching at a client device 130. The pre-caching system 110 can provide data from a data storage device 115 in response to data requests 140 received from the client device 130. The client device 130 provides the data requests 140 over a data communication network 120, e.g., a local area network (LAN), a wide area network (WAN), the Internet, or a combination thereof. Each data request 140 can specify particular data that a user has requested using the client device 130.

In response to each data request 140, the pre-caching system 110 can obtain the requested data from the data storage device 115 and provide the requested data 142 to the client device 130. For example, the pre-caching system 110 may send to the client device 130 the requested data 142 in one or more transmissions of one or more data packets. The pre-caching system 110 can also select and provide additional data 144 that was not requested by the data request 140. For example, the user of the client device 130 may not have requested the additional data 144. The additional data 144 can be cached at the client device 130 so that the additional data 144 can be provided quickly and without submitting another data request over the network 120 if the user requests the additional data 144. For example, the additional data 144 can be stored in a high-speed cache 135 of the client device 130. The high-speed cache 135 can include high-speed memory devices installed on the client device 130 and that store the additional data 144.

In some implementations, the pre-caching system 110 selects the additional data 144 based on a user of the client device 130. For example, the pre-caching system 110 may select the additional data 144 based on the user's previous interactions with one or more user interfaces that present data to the user, e.g., one or more user interfaces provided by the pre-caching system 110. The user interactions that the pre-caching system 110 uses to select the additional data 144 can include, for example, user interface elements (e.g., controls, display cards, types of graphs, etc.) with which the user has interacted, types of data requested by the user (e.g., keywords, performance measures, bids, etc.), actual data requested by the user (e.g., particular campaigns, particular keywords, particular content items, etc.), dimensions of data requested by the user (e.g., particular time periods, particular geographic locations, particular value ranges, etc.), how often the user accesses the account, and/or preferences selected by the user. For example, if a user requested during a previous user session the previous week's impression data for a particular advertising campaign, the pre-caching system 110 may provide as additional data for a current user session the previous week's impression data for the particular campaign prior to the user requesting this data.

In some implementations, some data requests 140 may be general or implicit requests rather than specific requests for specific data. For example, the pre-caching system 110 may generate and provide a user interface, e.g., a dashboard, with an initial account view that provides an overview of an account response to a user logging into or otherwise accessing the account. This summary of data can be selected in response to the user logging into the account rather than a specific request for the data included in the overview. The pre-caching system 110 can also select and provide additional data that the user may request after viewing the dashboard.

In some implementations, the pre-caching system 110 may also cache additional data at the pre-caching system 110. In this way, the pre-caching system can more quickly provide the data in response to a data request that specifies the additional data. This additional data can be selected in a similar manner as the additional data 144 sent to the client device 130. For example, the pre-caching system 110 may select a set of additional data for pre-caching. The pre-caching system 110 may send a subset of the additional data to the client device 130 for caching at the client device. The pre-caching system 110 may also cache a subset of the additional data at the pre-caching system 110. For example, the pre-caching system 110 may identify, from the set of additional data, data that the user is most likely to select and provide that data to the client device 130. The remaining data of the set of additional data may be cached at the pre-caching system 110. This caching at the pre-caching system 110 can reduce latency in providing the data to the client device 130 as obtaining the data from the data storage device 115 in response to requests for the data can take some time and increase the demand on computing resources used to obtain the data.

Figure 2:
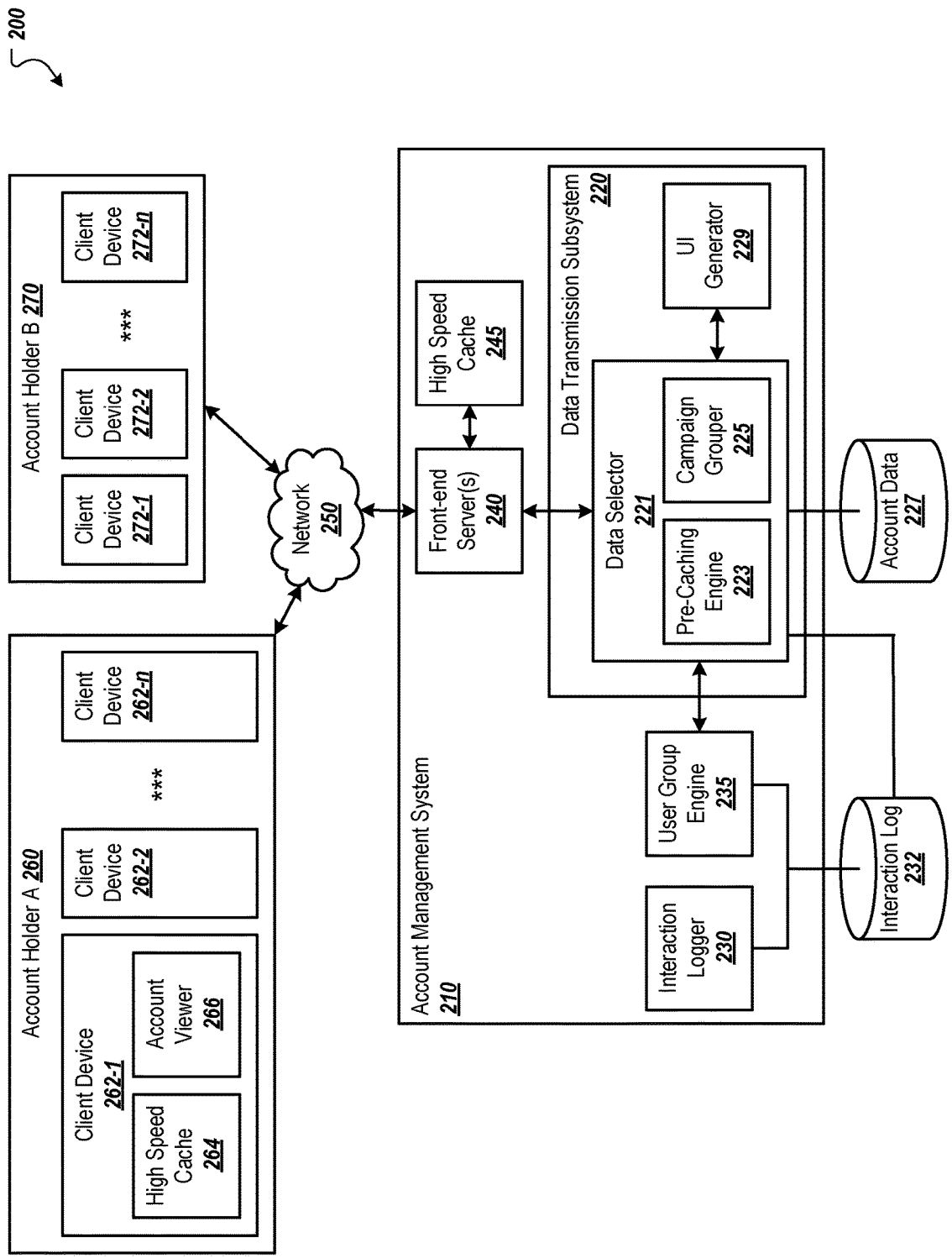
FIG. 2 is an example environment in which an account management system manages account data and provides user interfaces that present the account data.

FIG. 2 is an example environment 200 in which an account management system 210 manages online account data and provides user interfaces that present the account data. The account management system 210 can include one or more servers located in one or more data centers. The one or more servers can receive requests for online account data over a data communication network 250, e.g., a LAN, a WAN, the Internet, or a combination thereof. For example, the account management system 210 can include one or more front-end servers 240 that receives requests for online data and provides requested data to client devices 262 and 272 over the network 250. The account management system 210 can also include one or more back-end servers that receives the requests from the front-end server(s), obtains appropriate account data based on the requests, and provides the obtained data to the front-end server(s) 240.

The account management system 210 can manage online account data for multiple different accounts of multiple different account holders. For example, the account management system 210 can manage advertising account data for multiple different organizations, e.g., account holders 260 and 270. Although two account holders 260 and 270 are illustrated in FIG. 2, the account management system 210 can manage account data for other numbers of account holders. The systems and techniques described below can also be applied to various other types of data.

The account data managed by the account management system 210 can include any data related to an account, such as performance data for content items (e.g., number of impressions, click through rates, conversion rates, etc.), budget information for account holders, and/or content item distribution criteria. The account data for each account holder is stored in an account data storage device 227, which may include multiple data storage devices located in one or more data centers. The account data for each account holder may be stored separately and securely such that account data for one account holder is not provided to users of a different account holder.

Each account holder 260 and 270 can have one or more authorized users that are authorized to view data related to the account(s) of the account holder. For example, an organization may have multiple users that are authorized to manage campaigns for which the account management system 210 maintains account data. Each user authorized to access account data of the account holder 260 can access the account data using a client device 262-1-262-n. Similarly, each user authorized to access account data of the account holder 270 can access the account data using a client device 272-1-272-n. The users may be prompted to input credentials (e.g., username and password) prior to being given access to account data.

A client device is an electronic device that is capable of requesting and receiving electronic resources and other data over the network 250. Example client devices include personal computers, mobile communication devices (e.g., smartphones, tablet computing devices, and/or smart watches), and other devices that can send and receive data over the network 250. A client device typically includes a user application, such as a web browser, to facilitate the sending and receiving of data over the network 250. The web browser can enable a user to interact with text, images, videos, music, and other information typically located on a web page at a website. A client device can include other applications, e.g., native applications developed for a particular type of device or for a particular platform.

Each client device 262 and 272 can include a high-speed cache 264 and an account viewer 266. The account viewer 266 is an application that presents account data to a user of a client device. The account viewer 266 may be a web browser or a native application that requests account data from the account management system 210 and presents the account data using one or more user interfaces, as described in more detail below.

The high-speed cache 264 includes high-speed memory devices that store account data that may be presented by the account viewer 266. For example, the high-speed cache 264 may include static random-access memory (SRAM) and/or solid state memory devices. The high-speed cache 264 may store account data that has not yet been requested by a user of the client device. When the user requests account data stored in the high-speed cache 264, the account viewer 266 can obtain the account data quickly from the high-speed cache 264 and without submitting a request for the account data over the network 250. This pre-caching of data reduces the latency in presenting the account data and reduces the demand placed on the network 250 and computing resources of the account management system 210.

In some implementations, the account viewer 266 can be configured to check the high-speed cache 264 in response to requests for account data. If the requested account data is found in the high-speed cache 264, the account viewer 266 can obtain the account data from the high-speed cache 264 and present the account data to the user. If the requested account data is not in the high-speed cache, the account viewer 266 can request the account data from the account management system 210, e.g., by submitting a request over the network 250.

The account management system 210 includes a data transmission subsystem 220, an interaction logger 230, and a user group engine 235. The data transmission subsystem 220 receives and responds to requests for account data. The data requests may include specific requests for specific account data. An example of a specific request is a request for performance data for a particular campaign and during a particular time period. The account management system 210 can also provide account data in response to general or implicit requests. An example of a general or implicit request is a user logging into an account that the user is authorized to access. In this example, the data transmission subsystem 220 may select a summary of data to provide in an initial account view for the user.

The data transmission subsystem 220 includes a data selector 221 and a user interface generator 229. The data selector 221 identifies account data to provide in response to data requests (e.g., specific, general, or implicit requests) received from client devices. For example, the data selector 221 may access the account data storage device 227 to obtain specific data specified by a specific data request. For general or implicit data requests, the data selector 221 can select a subset of the account data based on the particular user for which the request was made. This subset of account data is a subset of the account data of an account that the user is authorized to access. For example, as described in more detail below, the data selector 221 may select a subset of the account data to provide based on the user's previous interactions with user interfaces provided by the account management system 210.

The user interface generator 229 can generate various user interfaces that present account data. The user interfaces can include a dashboard that includes user interface elements (e.g., controls, display cards, menus, etc.) that enable the user to request and view various data in various formats (e.g., graphs, charts, tables, etc.). The dashboard may present an initial account view each time the user initially accesses an account, e.g., in response to the user logging into an account. The initial account view can include a subset of the account data, e.g., that provides an overview of the account and that is adapted to the user that is accessing the account. As described in more detail below, the summary of account data can include data selected based on the user's previous interactions with user interfaces provided by the account management system 210.

Figure 3:
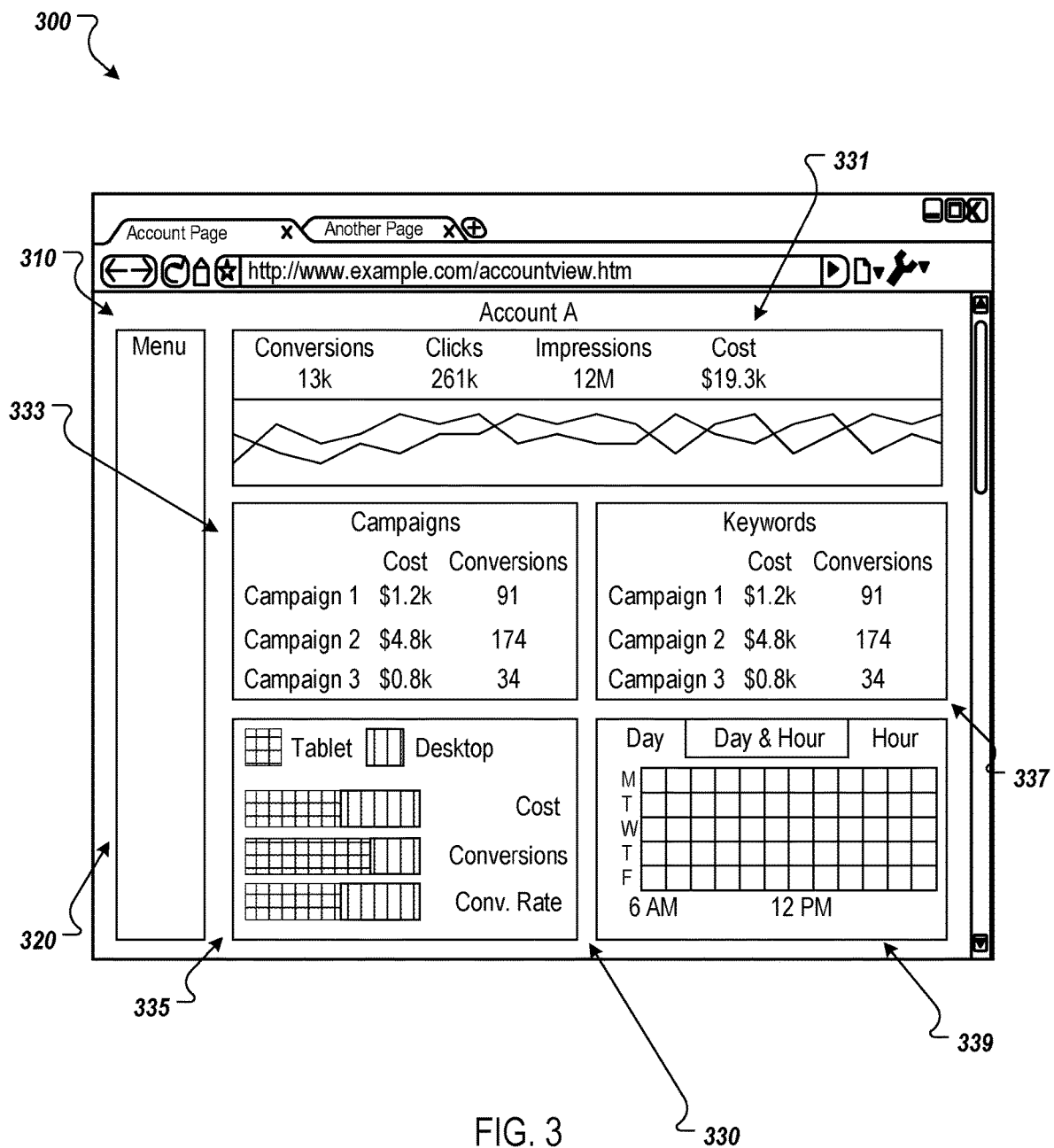
FIG. 3 is a screenshot of an example user interface in which account data is presented.

The user interfaces can include one or more display card user interface elements. Each display card can present a particular type of data in a particular way. For example, a first display card may present impression data for a content item in a table while a second display card may present click through rates for multiple keywords for distributing the content item using a bar graph. In some implementations, the user interface generator 229 selects display cards to provide in the initial account view based on the user's previous interactions with the display cards or other user interface elements. For example, if the user selects to view a particular display card at least a threshold number of times, the user interface generator 229 may provide the particular display card in the initial account view. In another example, the user interface generator 229 may include in the initial account view one or more display cards that the user selects to view with the greatest frequency. As described in more detail below, the user interface generator 229 may also select display cards for inclusion in the initial account view based on a user group to which the user is assigned. An example user interface is illustrated in FIG. 3 and described below.

The interaction logger 230 logs data describing users' interactions with user interfaces provided by the account management system 210 and/or presented by the account viewer 266. As described in more detail below, this interaction data is used to select account data that is provided to the user. For example, each user may log into their account to view account data and/or make changes to the accounts to which the user is authorized to view and makes changes. While the user is logged in, and with the user's permission, the interaction logger 230 can receive data describing the user's interactions with the user interfaces and store the data in a secure interaction log 232. For example, the account viewer 266 may include embedded scripts that obtain the data for each interaction and provides the data to the interaction logger 230. The data describing a user's interactions stored in the interaction log 232 can include, for example user interface elements (e.g., controls, display cards, types of graphs, etc.) with which the user has interacted, types of data requested by the user (e.g., keywords, performance measures, bids, etc.), actual data requested by the user (e.g., particular campaigns, particular keywords, particular content items, etc.), dimensions of data requested by the user (e.g., particular time periods, particular geographic locations, particular value ranges, etc.), how often the user accesses the account, preferences selected by the user, and/or other appropriate interaction data.

In some implementations, the interaction logger 230 generates a user profile for each user that includes the logged data. In the user profile for a user, the interaction logger 230 may include data identifying each user interface element with which the user has interacted, the number of times the user has interacted with the user interface element, and/or the frequency with which the user has interacted with the user interface element. The user profile for a user may also include data identifying each type of data requested by the user, a number of times the user has requested each type of data, and a frequency with which the user requests each type of data. The same identifying and frequency data can be stored for each particular portion of actual data requested by the user. For each type of data and/or for each particular portion of data requested by the user, the user profile can include the dimensions for the data. For example, if the user requested the performance of a particular content item during a particular time period, the user profile will include data specifying the particular time period for that type of data (performance data) and for the actual data (performance of the particular content item). After each user session in which the user accesses the online account, the user interaction logger 230 can update the user's profile to describe the user's interactions with data and user interface elements during the user session.

The user group engine 235 can assign users to user groups based on their interactions with user interfaces provided by the account management system 210. For example, the user group engine 235 may assign the users to user groups based on similarities between their user profiles. A user group can include, as members of the user group, users that have at least a threshold similarity with each other user in the group based on their user profiles. For example, a similarity score can be determined for each pair of users based on a similarity between data stored in the two users' profiles. If the similarity score satisfies a threshold (e.g., by meeting or exceeding the threshold), the two users may be included in a user group together. The similarity score can be based on a number of matching characteristics between the two users. For example, if the two users have requested the same types of data and/or selected the same user interface elements, the two users may have a higher similarity score than if the two users have not requested the same types of data or have not selected the same user interface elements. The user groups can be used to identify account data and user interface elements to provide to members of the groups as described in more detail below.

In some implementations, the user groups are based on particular roles in organizations. For example, the user group engine 235 may create and populate a user group for product managers and another user group for accountants. A user group for a particular role can include users that have a user profile that matches or is similar to a profile for the particular role. For example, users in particular roles may access the similar types of data over similar data dimensions and/or view the same or similar user interface elements.

Figure 6:
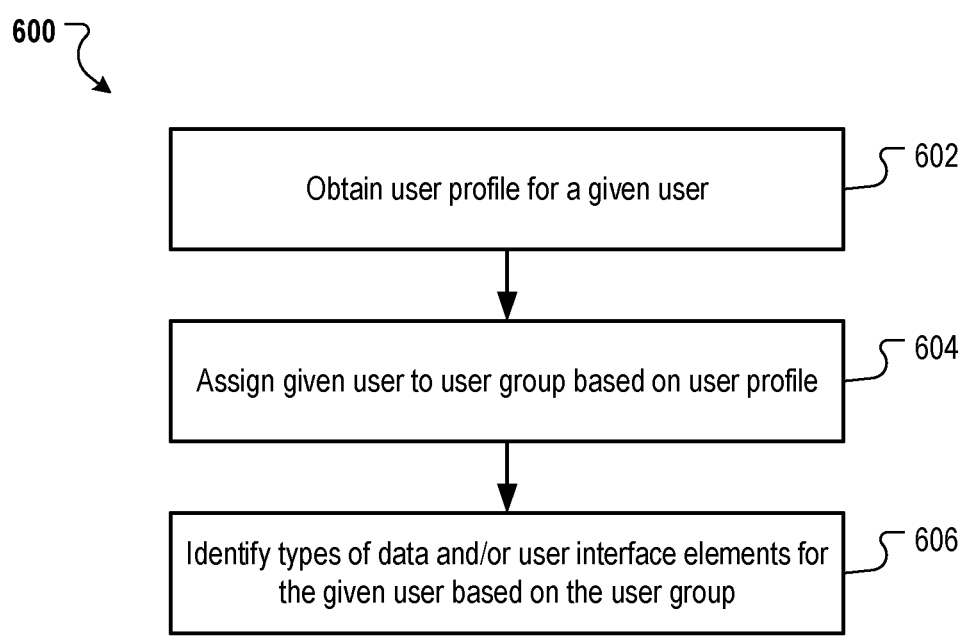
FIG. 6 is a flow chart of an example process for assigning a given user to a user group and identifying data to provide to the given user based on the user group.

A user group can include users for multiple different account holders. For example, the user group for product managers may include product managers for multiple different organizations. In this way, patterns of user interactions from multiple different organizations can be used to identify types of data that are more likely to be requested by users having the same roles or that are otherwise similar. An example process for assigning users to user groups is illustrated in FIG. 6 and described below.

As mentioned above, the data selector 221 can select data to provide to a user based on the user's previous interactions with user interfaces provided by the account management system 210. In particular, the data selector 221 may select data to provide in an initial account view for the user based on the user's previous interactions with user interfaces provided by the account management system 210. For example, when the user accesses an account at the account management system 210, the data selector 221 may select a first dataset of account data to provide in an initial account view for the user in response to the user accessing the account, and potentially data to be cached by the client device even though that data may not be used for the initial account view.

The data selector 221 may select data for inclusion in the first dataset based on a frequency at which particular data is requested or viewed by the user, a frequency at which particular types of data are requested or viewed by the user, a frequency at which the user has interacted with particular user interface elements, and/or other data included in the user's profile. For example, the initial account view may include a particular number of cards, e.g., selected by the user interface generator 229. The data selector 221 can select a first dataset for populating the display cards. This first dataset may include the most frequently requested data and/or the most frequently selected types of data for inclusion in the display cards.

The data selector 221 may select the first dataset based on the data dimensions requested by the user. For example, the first dataset may include data for a particular time period for which the user has previously requested data. In a particular example, a user may only be interested in recent data, e.g., data for events that occurred in the last week. In this example, the user may often request data for the previous week without requesting older data. The data selector 221 may provide this user, for presentation in an initial account view, a first dataset that includes data regarding events that occurred in the week prior to the user logging in. The data selector 221 may determine to not provide older data to this user until the user requests the data, resulting in less data being provided over the network and stored at the client device.

The data dimensions used in selecting the first dataset may also be selected based on frequency. For example, a user may request data for different time periods or different geographic locations. The data selector 221 may select the first dataset based on the most frequently requested time period(s) or geographic location(s).

The data selector 221 may select the first dataset for the initial account view based on the types of data to be presented in the initial account view for the user. For example, a particular display card may present a particular type of data. If the particular card is selected for the initial account view, then the data selector 221 may select, for inclusion in the first dataset, the appropriate data for populating the particular display card.

In some implementations, the data selector 221 can also select the first dataset based on a user group or role to which the user has been assigned. For example, other users in the group or that have the same role may request particular types of data or interact with particular user interface elements (e.g., particular display cards). The data selector 221 may include types of data requested by other users in the group (or that are assigned the same role) in the first dataset as the user may be interested in these types of data or may find these types of data useful. Of course, the actual data from other accounts would not be included in the first dataset. Instead, the data selector 221 may identify, within the account that the user is authorized to access, account data of the same type that other users in the group have requested.

The data selector 221 can select for inclusion in the first dataset the types of data requested by others in the user group based on the frequency at which other users in the group request or view the types of data. For example, if the group as a whole most frequently requests or views a particular type of data, data of that particular type may be included in the first dataset. The data selector 221 can also select for inclusion in the first dataset the types of data requested by other users in the user group based on the number of other users that request or view the types of data. For example, a particular type of data that is requested or viewed by the most users (or at least a threshold number of users) may be included in the first dataset.

Similarly, the user interface generator 229 can select user interface elements, e.g., display cards, to include in the initial account view based on the user interface elements that other users in the user group have selected or viewed. For example, the user interface generator 229 may select user interface elements for the initial account view based on the number of times users in the user group have selected or viewed the user interface elements and/or the number of users in the group that have selected or viewed the user interface elements.

By selecting user interface elements and data to include in the initial account view for a user based on the user's previous interactions with user interfaces provided by the account management system 210 and/or based on the interactions of other users included in a group with the user, the account management system 210 can provide a summary of data that is likely to be the most useful to the user, thereby improving the usefulness of the summary of data. This can result in greater user satisfaction and a reduction in the number of requests for additional data submitted by the user.

Thus, this selection process can reduce the demand placed on a network and the latency caused by the network.

The data selector 221 includes a pre-caching engine 223 and a campaign grouper 225. The pre-caching engine 223 can select one or more second datasets to provide to a client device in response to a request for account data. The pre-caching engine 223 can select the second dataset in response to specific requests for specific data and/or general or implicit requests for data (e.g., user logging into account). The pre-caching engine 223 can select and provide the second dataset prior to receiving a request for the data included in the second dataset. For example, the second dataset can be data that was not specified in a specific request or that was not selected for inclusion in the first dataset provided for the initial account view.

The pre-caching engine 223 can send the second dataset to the client device with account data obtained in response to a specific request or with the first dataset. Or, the pre-caching engine 223 can provide the second dataset after the other data has been sent to the client device. The client device can store the second dataset in a high-speed cache 264. In this way, the account data of the second dataset can be presented to the user more quickly in the event that the user requests such data.

The pre-caching engine 223 can select data for inclusion in the second dataset for a user based on the user's previous interactions with user interfaces provided by the account management system 210 and/or the user group or role to which the user has been assigned. Similar criteria used to select the first dataset can be used to select the second dataset. For example, the pre-caching engine 223 can select data for inclusion in the second dataset based on a frequency at which particular data is requested or viewed by the user, a frequency at which particular types of data are requested or viewed by the user, a frequency at which the user has interacted with particular user interface elements, the data dimensions requested by the user, the frequency at which other users in the user group request or view types of data, the number of other users in the user group that request or view the types of data, and/or other appropriate data regarding the user's interaction with user interfaces and data regarding other users' interactions with user interfaces.

In some implementations, the first dataset may be selected based on the user's previous interactions with the user interfaces while the second dataset is selected based on interactions of other users in the user group or role to which the user has been assigned. In some implementations, the first dataset and the second dataset are both selected based on a combination of the user's previous interactions with user interfaces provided by the account management system 210 and the interactions of other users in the user group or role to which the user has been assigned. In this example, the user's interactions may be given more weight than the interactions of other users in the user group or role to which the user has been assigned.

In some implementations, the pre-caching engine 223 may store the second dataset, a portion of the second dataset, or a different third dataset in a high-speed cache 245 of the front-end server(s) 240. For example, the front-end server(s) 240 may include or be coupled to a high-speed cache 245 that includes high-speed memory, such as SRAM and/or solid state memory devices. In some implementations, the second dataset may be stored in the high-speed cache 245 of the account management system 210 rather than in the high-speed cache of the client device. In some implementations, a portion of the second dataset is stored in the high-speed cache 245 of the account management system 210 and a portion of the second dataset is cached at the client device.

In some implementations, the second dataset may be stored in the high-speed cache of the client device and a third dataset may be stored in the high-speed cache 245 of the account management system 210. The third dataset may be selected in a similar manner as the second dataset. By storing additional data at the front-end server(s), the latency in presenting the additional data in response to a request for the additional data can be reduced as it eliminates the time required to identify and retrieve the data from the account data storage device 227.

The campaign grouper 225 can identify groups of campaigns (or other groups of information) that are similar, but have a particular characteristic in which all of the campaigns differ. For example, an account holder may have multiple different campaigns for the same product or service and that uses the same keywords and content items. However, each campaign may be directed to a different state. In this example, the content item distribution criteria may be the same for each campaign except the state in which the content item for each campaign can be distributed. The campaign grouper 225 can identify and add these campaigns to a campaign group.

The user interface generator 229 can generate a visualization for each campaign group that highlights the difference between the campaigns and any difference in campaign performance based on the difference. Continuing the previous example, the user interface generator 229 may generate a visualization that includes a map of the fifty states. On the map, the visualization may highlight the performance of the campaign in each state, e.g., using performance numbers, colors that illustrate the performance, or another visual effect that highlights the difference between the campaigns in the different states.

In another example, the user interface generator 229 may generate a visualization that highlights the differences in performance of the same or similar campaigns that differ based on the day of the week in which content items are provided for the campaigns. For example, a heat map may be used to show the relative performance of the campaign on different days of the week. In yet another example, multiple campaigns may differ only based on the type of keyword matching (e.g., exact match, broad match, etc.). In this example, a user interface may present the performance of the campaigns for each type of keyword matching.

FIG. 3 is a screenshot 300 of an example user interface 310 in which account data is presented. The example user interface 310 includes an initial account view of an account displayed in a dashboard for the account. The initial account view can be generated for a given user, for example, based on the given user's interactions with user interfaces during previous user sessions in which the user accessed the account.

The user interface 310 includes a menu 320 and a set of display cards 330. The menu 310 can provide a list of other display cards that the user can select to view. The menu 310 can also provide a list of data that the user can select to view. In response to a selection of an item in the menu 320, the user interface 310 can cause the client device presenting the user interface 310 to request the selected display card or selected data. For example, the client device may first access a cache of the client device to determine whether the selected data (or data that is to be presented in the selected display card) is stored in the cache. If so, the client device can obtain the data from the cache and present the data in the user interface 310. If the data is not stored in the cache, the client device can request the data from a remote system e.g., the account management system 210 of FIG. 2.

Each display card can present a particular type of data in a particular manner. For example, a display card 331 presents performance data (e.g., number of conversions, number of clicks, and number of impressions) and cost data for a campaign. The display card 331 presents this data in numerical format and also includes a line chart that presents at least a portion of the performance and/or cost data.

A display card 333 presents performance and cost data for several advertising campaigns in a table format. Similarly, a display card 337 presents in a table format performance and cost data for several keywords that have been used to distribute content items. Another display card 335 presents bar graphs that illustrate performance and cost data for different types of devices at which content items for a campaign have been presented. Yet another display card 339 presents a heat map that illustrates a campaign metric (e.g., a performance measure, cost measure, etc.) over time. For example, the darkness of each square in the heat map may vary based on the value of the metric for the corresponding time. The time range for the heat map can be adjusted by selecting "Day", "Day & Hour", or "Hour" at the top of the display card 339.

As discussed above, the display cards and/or the data included in the initial account view can be selected based on the user's previous interactions with user interfaces and/or a user group to which the user has been assigned. For example, the display cards 331-339 and the data presented by the display cards 331-339 may be selected based on the user selecting the display cards 331-339 during a previous user session with the account. In addition, the campaigns included in the display card 333 may be selected based on the user previously requesting data related to these campaigns. Similarly, the keywords included in the display card 337 may be selected based on the user requesting data related to these keywords. In another example, the time range presented in the display card 339 may be selected based on the user previously interacting with the display card 339 (or another display card) to view data for that time period.

Additional cards with additional data can be provided to the client device and cached at the client device prior to the user requesting the additional cards. For example, the user interface 310 includes five display cards 331-339. However, the user may often view nine different display cards. The five display cards presented in the user interface and the other four display cards (along with the data presented in the display cards) can be provided to the client device when the user logs into the account. In this way, when the user selects one of the four display cards, the selected display card can be presented to the user quickly and without submitting another request over the network.

Another example display card can show the ways in which a particular content item has been displayed at user's devices. For example, a content item may be presented in different ways based on the type of client device at which the content item is presented (e.g., a content item may be presented differently on a smartphone than a desktop computer), the location on a resource with which the content item is presented (e.g., a content item may be presented differently at the top of a web page than on one side of a web page), or the type of resource with which the content item has been presented (e.g., a content item may be presented differently on a search results page than on a blog). For this display card, the user interface generator 229 can make a probabilistic determination as to how the content item was displayed for each impression of the content item and display a representation of how the content item was presented. For example, the user interface generator 229 may make the probabilistic determination for a particular impression based on the type of device at which the content item was presented, the location on the resource at which the content item was presented, the type of resource with which the content item was presented, and/or other appropriate data that can affect the presentation of a content item.

The display card can present a subset of the ways in which the content item was determined to have been presented. For example, the user interface generator 229 may make a probabilistic determination as to how the content item was displayed for each impression of the content item. The user interface generator 229 may count the number of impressions for each way in which the content item may have been presented based on the probabilistic determinations. The user interface generator 229 may then generate the display card that depicts the representation of the content item for the ways that have the most impressions. For example, the top four representations based on impressions may be presented in the display card. In this way, a user can quickly see how the content item is likely to have been presented to users.

Figure 4:
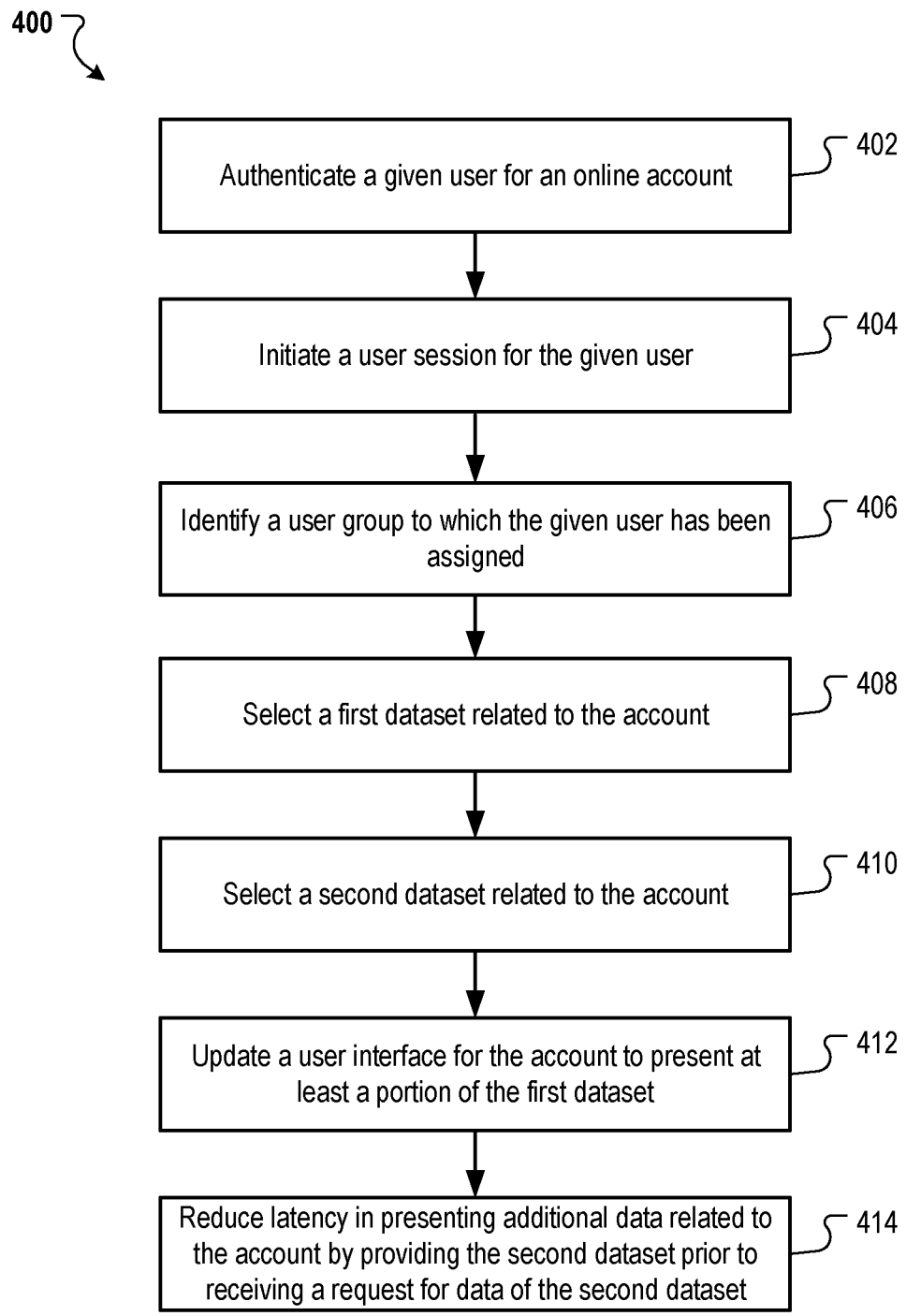
FIG. 4 is a flow chart of an example process for reducing latency in presenting account data.

FIG. 4 is a flow chart of an example process 400 for reducing latency in presenting account data. Operations of the process 400 can be implemented, for example, by a data processing apparatus, such as the account management system 210 of FIG. 1. The process 400 can also be implemented by instructions stored on computer storage medium, where execution of the instructions by a data processing apparatus cause the data processing apparatus to perform the operations of the process 400.

A given user is authenticated for an online account (402). The online account may be an advertising account to which the user has access. For example, the user may be an employee of an organization for which an account management system manages the organization's account data. Multiple different users may have access to the account. For example, the organization may have different employees in different roles (e.g., product manager, brand manager, campaign manager, etc.) that each have access to the online account to view and/or modify data relevant to the employees.

The given user may be authenticated based on data submitted through a client device of the given user. For example, the user may provide a unique username and password to access the online account. The user may be authenticated for the online account if the username and password provided by the given user matches the username and password stored for the given user.

A user session is initiated for the given user in response to authenticating the user (404). The user session allows the user to view account data for the online account. The account data can be presented to the user using one or more user interfaces. For example, a dashboard may be presented to the user. This dashboard can include an initial account view with an overview of the account. In addition, the dashboard may include links or other user interface controls that enable the user to request additional data or select other display cards in which the given user may be interested.

A user group to which the given user is assigned is identified (406). For example, the given user may be assigned to one or more user groups based on similarities between the given user's interactions with user interface elements presented in the user interface of the account during previous user sessions and other interactions of other users with the user interface elements. The given user may also be assigned to a user group based on similarities between at least one type of data requested by the given user during the previous user sessions and at least one type of data requested by other users. An example process for assigning users to user groups is illustrated in FIG. 6 and described below.

A first dataset related to the online account is selected (408). The first dataset includes account data of the online account to which the user have been authenticated to access. For example, the first dataset may include account data for presentation in an initial account view that provides an overview of the online account to the given user. The initial account view may be custom to the given user and based on the user's previous requests for and/or interactions with user interface elements (e.g., particular display cards, controls, graphs, etc.), the given user's requests or modifications to data or types of data, the given user's requests or views of particular dimensions of data (e.g., time periods, geographic locations, etc.), how often the given user accesses the online account, preferences selected by the given user, the user group to which the given user has been assigned, and/or other appropriate data. The initial account view can present multiple different types of data combined into a single presentation and that provides an overview of the online account to the given user.

In some implementations, the first dataset for presentation in the initial account view may be selected from a data store of account data for the online account based on the user's previous interactions with user interfaces presented in previous user sessions of the given user and/or the user group(s) to which the given user has been assigned. For example, the first dataset may be selected based on the types of data requested by the given user during the previous user sessions and/or user interface elements with which the given user has interacted during previous user sessions of the given user. The first dataset may also be selected based on the types of data requested by the other user in the user group(s) to which the given user has been assigned and/or user interface elements with which the other users have interacted.

A second dataset related to the online account is selected (410). The second dataset can include data that is not presented in the initial account view. Instead, the second dataset may be sent to the given user's client device for caching at the client device. In this way, if the given user requests to view additional data not shown in the initial account view, but that is included in the second dataset, the additional data can be presented to the given user without requesting the additional data from a remote device. Thus, the latency in presenting the additional data can be reduced.

In general the second dataset may include data that is likely to be relevant to the given user, but may not be as relevant as the data in the first dataset. The second dataset can also be selected based on the user's previous interactions with user interfaces presented in previous user sessions of the given user and/or the user group(s) to which the given user has been assigned. For example, the second dataset may be data that has been requested by at least a threshold number of other users in the user group(s) to which the given user has been assigned or that has been requested at least a threshold number of times by other users in the user group (s).

A user interface for the account is updated to present at least a portion of the first dataset (412). For example, a user interface in which the given user submitted the authorization data can be updated to present the initial account view of the account for the given user. The initial account view, which provides an overview of the online account to the given user, can include at least a portion of the first dataset.

The latency in updating the user interface when presenting additional portions of the first dataset or the second dataset at the client device is reduced by providing the second dataset to the client device prior to receiving a request for the second dataset from the client device (414). For example, the second dataset can be sent to the client device with the first dataset. In another example, the second dataset can be sent to the client device after the first dataset is sent to the client device, but before a request for the second dataset is received. The second dataset (and the first dataset) can be stored in a cache of the client device to reduce the latency in presenting the cached data when requested at the client device.

After each user session, the given user's profile can be updated based on the interactions of the given user with data and user interface elements during the user session. Based on the updates to the profile, the initial account view for the user may be updated. For example, the initial account view may be updated to present a display card that the user requested during the user session and/or data that the user requested or modified during the user session. The included in the first dataset and/or the second dataset may similarly be updated based on updates to the given user's profile.

The cache of the client device may be refreshed with updated data, for example, if the data has changed or the data has been stored in the cache for at least a threshold amount of time. However, there are costs associated with updating the cache. For example, large amounts of data may need to be obtained and transmitted across the network. Thus, a pre-caching engine, e.g., the pre-caching engine 223 of FIG. 1, can determine whether to update the cache based on these costs and associated benefits with updating the cache.

Figure 5:
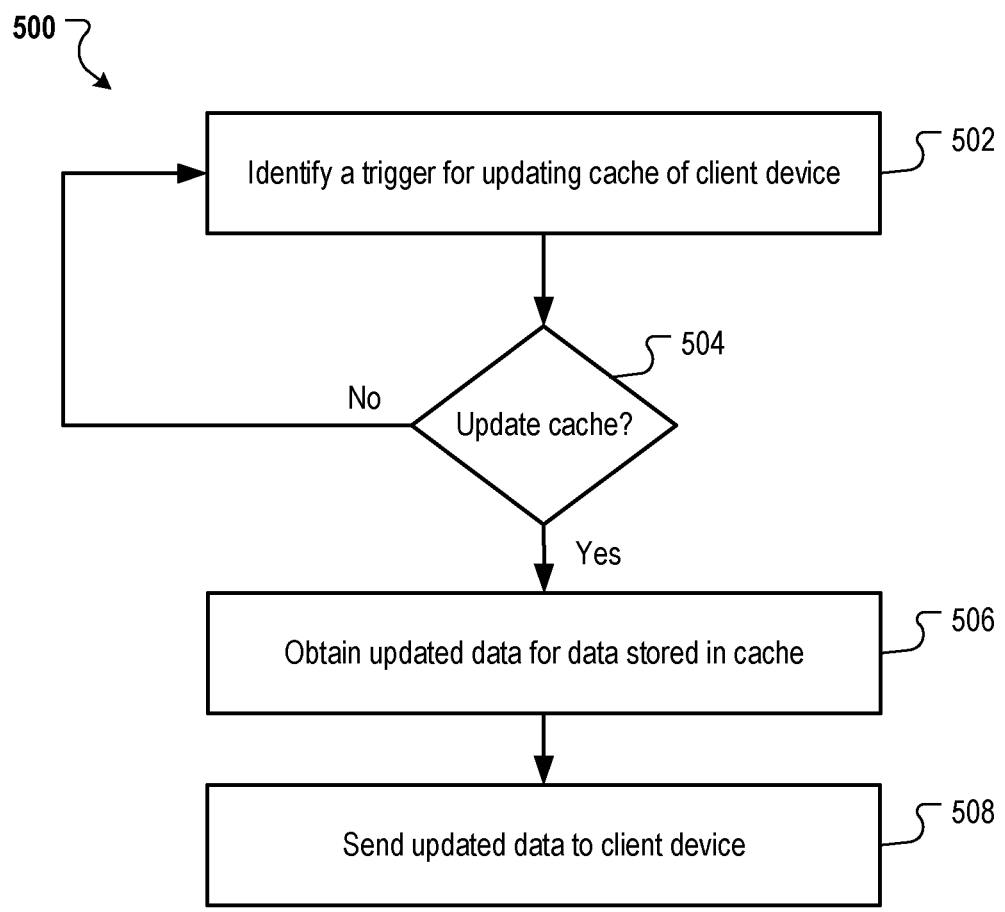
FIG. 5 is a flow chart of an example process for updating a cache.

FIG. 5 is a flow chart of an example process 500 for updating a cache. Operations of the process 500 can be implemented, for example, by a data processing apparatus, such as the account management system 210 of FIG. 1. The process 500 can also be implemented by instructions stored on computer storage medium, where execution of the instructions by a data processing apparatus cause the data processing apparatus to perform the operations of the process 500.

A trigger is identified for updating the cache of a client device (502). In some implementations, the trigger may be based on an amount of time that has elapsed since data was transmitted to the client device for storage in the cache. The trigger can also be based on whether data stored in the cache has changed from the value stored in the cache. For example, the number of conversions for a content item may have increased due to a new conversion event that occurred after the cache was populated with data that includes the number of conversions for the content item. The trigger can be based on a number of data items that have changed since the data was transmitted to the client device for storage in the cache. For example, if at least a threshold number of data items have changed, a cache update may be triggered. The trigger can also be based on a user modification to account data.

A determination is made whether to update the cache in response to identifying the trigger (504). The determination can be based on a cost associated with updating the cache and a benefit associated with updating the cache. For example, an update to the cache requires the use of computing resources and network resources to obtain updated data and transmit the updated data to the client device. Another cost is the amount of time it takes to update the cache with the updated data.

The benefits include presenting up to date data rather than old data. The benefits may also include reduced latency in presenting the updated data, for example, if the client device requests the updated data in response to a user request to view the data. However, the benefit of up to date data to a user may depend on the type of data. For example, impression data for a previous year is unlikely to change and any change would likely be minimal. Thus, the benefit of updating a cache with data for a historical time period may have little benefit. However, the benefits of updating the current day's performance data may be very beneficial to a user.

In some implementations, the determination of whether to update the cache is based on the type of data and/or the amount of data stored in the cache. For example, some types of data can take longer to obtain and provide over the network and/or include more data that has to be transmitted. In some implementations, the determination of whether to update the cache is based on historical data related to the types of data and/or amount of data stored in the cache. For example, the determination may be based on an analysis of previous latency numbers for previous query patterns.

If a determination is made to not update the cache, the cache is not updated. Instead, the process 500 may wait until another trigger is identified and another determination can be made at that time whether to update the cache. If a determination to update the cache is made, updated data is obtained for at least a portion of the data stored in the cache (506). For example, all of the cached data may be updated. In another example, only the data that has been changed since the data was cached at the client device may be updated.

The updated data is transmitted to the client device (508). For example, the updated data may be transmitted to the client device over a network using one or more data transmissions of one or more data packets. Once received, the client device can replace the previous cached data with the updated data.

FIG. 6 is a flow chart of an example process 600 for assigning a given user to a user group and identifying data to provide to the given user based on the user group. Operations of the process 600 can be implemented, for example, by a data processing apparatus, such as the account management system 210 of FIG. 1. The process 600 can also be implemented by instructions stored on computer storage medium, where execution of the instructions by a data processing apparatus cause the data processing apparatus to perform the operations of the process 600.

A user profile is obtained for a given user (602). The user profile for the given user can include data describing pervious user interactions with user interfaces that present account data. For example, as described above, the user profile for a given user may include data identifying each user interface element with which the given user has interacted, the number of times the given user has interacted with the user interface element, and/or the frequency with which the given user has interacted with the user interface element. The user profile for a given user may also include data identifying each type of data requested by or modified by the given user, a number of times the given user has requested or modified each type of data, and a frequency with which the given user requests or modifies each type of data. The same identifying and frequency data can be stored for each particular portion of actual data requested or modified by the given user. For each type of data and/or for each particular portion of data requested by the given user, the user profile can include the dimensions for the data (e.g., time period or geographic location for the data).

The given user is assigned to a user group based on the user profile for the given user (604). In some implementations, the given user is assigned to a user group based on a similarity between the given user's profile and other users' user profiles. For example, the given user may be assigned to a user group with other users that have similar user profiles. In particular, the given user may be assigned to a user group based on similarities between the given user's interactions with user interface elements (e.g., controls) presented in user interface for the user's account during previous user sessions and other interactions of other users with user interface elements presented in user interfaces. The given user may also be assigned to a user group based on a similarity between types of data requested by the given user and types of data requested by other users and/or the similarity between dimensions of data requested by the given user and other users.

In some implementations, a machine learning process is used to generate and populate user groups based on similarities between the user profiles of the users. For example, the machine learning process may be based on decision trees, neural networks, deep learning, and/or clustering techniques.

Types of data and user interface elements are identified for the given user based on the user group(s) to which the given user is assigned. For example, the given user may be provided types of data requested by other users in the group and/or user interface elements selected or viewed by other users in the group. In a particular example, the given user may be provided types of data requested by at least a threshold number of users in the user group or the types of data requested most frequently by users in the user group. Similarly, the given user may be provided user interface elements selected or viewed by at least a threshold number of users in the group and/or user interface elements most frequently selected or viewed by users in the user group.

Figure 7:
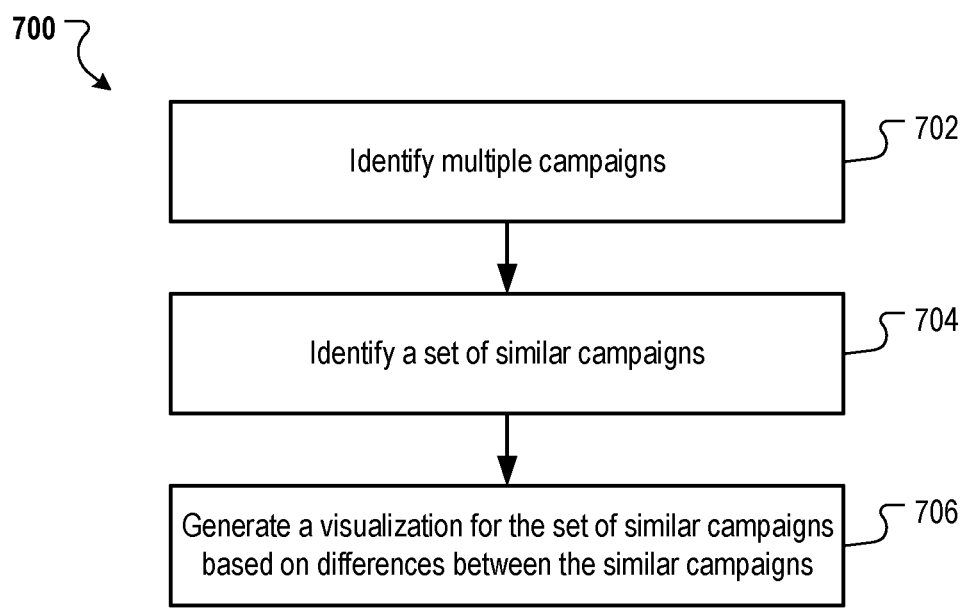
FIG. 7 is a flow chart of an example process for generating a visualization that presents account data for multiple campaigns.

FIG. 7 is a flow chart of an example process 700 for generating a visualization that presents account data for multiple campaigns. Operations of the process 700 can be implemented, for example, by a data processing apparatus, such as the account management system 210 of FIG. 1. The process 700 can also be implemented by instructions stored on computer storage medium, where execution of the instructions by a data processing apparatus cause the data processing apparatus to perform the operations of the process 700.

Multiple campaigns of an account holder are identified (702). For example, an account holder may have multiple different advertising campaigns. In a particular example, an account holder may have multiple different campaigns for a product or service. The account holder may also have campaigns for other products or services.

A set of similar campaigns of the account holder is identified (704). The set of similar campaigns can include campaigns that are similar, but have a particular characteristic in which all of the campaigns differ. For example, the account holder may have multiple different campaigns for a particular product and with the same distribution criteria, but with a different content item that is distributed for each campaign. These different campaigns can be included in a set of campaigns for the particular product.

A visualization is generated for the set of campaigns (706). For example, the visualization may highlight the difference in data for the campaigns in the set of campaigns.

Continuing the previous example, the visualization may highlight the performance of each content item for each campaign in the set of campaigns. The visualization can be automatically generated and provided in a display card for presentation at a client device of the account holder's user(s). For example, the visualization may be automatically generated in response to identifying the set of similar campaigns and in such a way that it highlights the one different characteristic.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
generating, by the data processing apparatus and for presentation on a client device during a same user session initiated by a particular user, a visualization of an initial dashboard user interface that includes multiple different display cards that provide different reports for a given online account for presentation to the particular user during the same user session, wherein the multiple different display cards present different types of data in a same user interface;
selecting, by the data processing apparatus, a set of data for a different display card that is not included in the initial dashboard user interface; and
reducing latency for presenting an updated dashboard user interface at the client device during the same user session in which the initial dashboard user interface is displayed at the client device for presentation to the particular user during the same user session by pre-caching, at the client device, the set of data for the different display card that is not included in the initial dashboard, wherein the pre-caching is performed prior to a request from the client device to present the different display card and while the initial dashboard user interface is displayed at the client device during the same user session;
detecting, during the same user session, a trigger to update the pre-cached set of data for the different display card;
determining, in response to detecting the trigger and during the same user session, whether to update the pre-cached set of data for the different display card, including:
updating the pre-cached set of data for the different display card when an analysis indicates that the pre-cached set of data should be updated; and
waiting for another trigger before updating the pre-cached set of data for the different display card when the analysis indicates that the pre-cached set of data should not be updated;
wherein the trigger to update the pre-cached set of data for the different display card is based on an amount of time that has elapsed since data was transmitted to the client device for storage in a cache of the client device that is at least a threshold amount of time.

2. The method of claim 1, wherein the trigger to update the pre-cached set of data for the different display card is based on a value of the data stored in a cache on the client device that is a different value than a current value of the data.

3. The method of claim 2, wherein the trigger to update the pre-cached set of data for the different display card is based on a threshold number of data items of the pre-cached set of data that have changed from a previous update to the pre-cached set of data in the cache.

4. The method of claim 1, wherein determining, whether to update the pre-cached set of data for the different display card is based on i) a type of data stored in a cache on the client device, ii) an amount of data stored in the cache on the client device, or iii) a combination thereof.

5. The method of claim 1, wherein updating the pre-cached set of data for the different display card includes replacing previously cached data with updated data.

6. The method of claim 1, further comprising:
after pre-caching the set of data for the different display card, receiving the request to present the different display card from the client device; and
generating, by the data processing apparatus, a visualization of the updated dashboard user interface that includes the different display card that was not included in the initial dashboard user interface and that was pre-cached at the client device prior to the request by the particular user to present the different display card.

7. A system, comprising:
a first front-end server, including one or more processors, that generates, for presentation on a client device during a same user session initiated by a particular user, a visualization of an initial dashboard user interface that includes multiple different display cards that provide different reports for a given online account for presentation to the particular user during the same user session, wherein the multiple different display cards present different types of data in a same user interface; and
a second front-end server, including one or more processors, that selects a set of data for a different display card that is not included in the initial dashboard user interface, reduces latency for presenting an updated dashboard user interface at the client device during the same user session in which the initial dashboard user interface is displayed at the client device for presentation to the particular user during the same user session by pre-caching, at the client device, the set of data for the different display card that is not included in the initial dashboard, wherein the pre-caching is performed prior to a request from the client device to present the different display card and while the initial dashboard user interface is displayed at the client device during the same user session, and detects, during the same user session, a trigger to update the pre-cached set of data for the different display card, determines, in response to detecting the trigger and during the same user session, whether to update the pre-cached set of data for the different display card, including:
updating the pre-cached set of data for the different display card when an analysis indicates that the pre-cached set of data should be updated; and
waiting for another trigger before updating the pre-cached set of data for the different display card when the analysis indicates that the pre-cached set of data should not be updated;
wherein the trigger to update the pre-cached set of data for the different display card is based on an amount of time that has elapsed since data was transmitted to the client device for storage in a cache of the client device that is at least a threshold amount of time.

8. The system of claim 7, wherein the trigger to update the pre-cached set of data for the different display card is based on a value of the data stored in a cache on the client device that is a different value than a current value of the data.

9. The system of claim 8, wherein the trigger to update the pre-cached set of data for the different display card is based on a threshold number of data items of the pre-cached set of data that have changed from a previous update to the pre-cached set of data in the cache.

10. The system of claim 7, wherein determining, whether to update the pre-cached set of data for the different display card is based on i) a type of data stored in a cache on the client device, ii) an amount of data stored in the cache on the client device, or iii) a combination thereof.

11. The system of claim 7, wherein updating the pre-cached set of data for the different display card includes replacing previously cached data with updated data.

12. The system of claim 7, further comprising:
after pre-caching the set of data for the different display card, receiving the request to present the different display card from the client device; and
generating a visualization of the updated dashboard user interface that includes the different display card that was not included in the initial dashboard user interface and that was pre-cached at the client device prior to the request by the particular user to present the different display card.

13. A non-transitory computer storage medium encoded with a computer program, the program comprising instructions that when executed by one or more data processing apparatus cause the data processing apparatus to perform operations comprising:
generating, by the data processing apparatus and for presentation on a client device during a same user session initiated by a particular user, a visualization of an initial dashboard user interface that includes multiple different display cards that provide different reports for a given online account for presentation to the particular user during the same user session, wherein the multiple different display cards present different types of data in a same user interface;
selecting, by the data processing apparatus, a set of data for a different display card that is not included in the initial dashboard user interface; and
reducing latency for presenting an updated dashboard user interface at the client device during the same user session in which the initial dashboard user interface is displayed at the client device for presentation to the particular user during the same user session by pre-caching, at the client device, the set of data for the different display card that is not included in the initial dashboard, wherein the pre-caching is performed prior to a request from the client device to present the different display card and while the initial dashboard user interface is displayed at the client device during the same user session;
detecting, during the same user session, a trigger to update the pre-cached set of data for the different display card;
determining, in response to detecting the trigger and during the same user session, whether to update the pre-cached set of data for the different display card, including:
updating the pre-cached set of data for the different display card when an analysis indicates that the pre-cached set of data should be updated; and
waiting for another trigger before updating the pre-cached set of data for the different display card when the analysis indicates that the pre-cached set of data should not be updated;
wherein the trigger to update the pre-cached set of data for the different display card is based on an amount of time that has elapsed since data was transmitted to the client device for storage in a cache of the client device that is at least a threshold amount of time.

14. The storage medium of claim 13, wherein the trigger to update the pre-cached set of data for the different display card is based on a value of the data stored in a cache on the client device that is a different value than a current value of the data.

15. The storage medium of claim 14, wherein the trigger to update the pre-cached set of data for the different display card is based on a threshold number of data items of the pre-cached set of data that have changed from a previous update to the pre-cached set of data in the cache.

16. The storage medium of claim 13, wherein determining, whether to update the pre-cached set of data for the different display card is based on i) a type of data stored in a cache on the client device, ii) an amount of data stored in the cache on the client device, or iii) a combination thereof.

17. The storage medium of claim 13, further comprising:
   after pre-caching the set of data for the different display card, receiving the request to present the different display card from the client device; and
   generating, by the data processing apparatus, a visualization of the updated dashboard user interface that includes the different display card that was not included in the initial dashboard user interface and that was pre-cached at the client device prior to the request by the particular user to present the different display card.

* * * * *